United States Patent
Haney et al.

(10) Patent No.: US 7,698,108 B2
(45) Date of Patent: Apr. 13, 2010

(54) PARAMETERIZATION OF NON-LINEAR/NON-GAUSSIAN DATA DISTRIBUTIONS FOR EFFICIENT INFORMATION SHARING IN DISTRIBUTED SENSOR NETWORKS

(76) Inventors: Philip J. Haney, 32 Mallard Point, Merrimack, NH (US) 03054; Geoffrey S. Edelson, 6 Paddock Ln., Andover, MA (US) 01810; Paul D. Fiore, 70 Amble Rd., Chelmsford, MA (US) 01824

( * ) Notice: Subject to any disclaimer, the term of this patent is extended or adjusted under 35 U.S.C. 154(b) by 307 days.

(21) Appl. No.: 11/973,693

(22) Filed: Oct. 10, 2007

(65) Prior Publication Data

US 2008/0215298 A1    Sep. 4, 2008

Related U.S. Application Data

(60) Provisional application No. 60/850,463, filed on Oct. 10, 2006.

(51) Int. Cl.
*H03F 1/26* (2006.01)
*G06F 19/00* (2006.01)
(52) U.S. Cl. .................. 702/189; 702/121; 702/188; 702/190
(58) Field of Classification Search ......... 702/179–190, 702/121–123
See application file for complete search history.

(56) References Cited

U.S. PATENT DOCUMENTS 5,311,173 A * 5/1994 Komura et al. ......... 340/995.22
7,355,508 B2 * 4/2008 Mian et al. ............... 340/426.1
2005/0251328 A1 * 11/2005 Merwe et al. ............. 701/200

OTHER PUBLICATIONS

Orton, et al., A Bayesian Approach to Tracking Multiple Targets Using Sensor Arrays and Particle Filters, IEEE Transactions on Signal Processing, vol. 50, No. 2, Feb. 2002, pp. 216-223.
Ong, et al., A Comparison of Probabilistic Representations for Decentralised Data Fusion, ISSNIP 2005, IEEE, pp. 187-192.
Borkar, et al., A Monte-Carlo Method for Initializing Distributed Tracking Algorithms, 4 pages, Georgia Institute of Technology, Atlanta, GA 30332-0250.
Julier, et al., A Non-Divergent Estimation Algorithm in the Presence of Unknown Correlations, 5 pages.
Arulampalam, et al., A Tutorial on Particle Filters for On-Line Non-Linear/Non-Gaussian Bayesian Tracking, 18 pages.
Ridley, et al., Tracking in Decentralised Air-Ground Sensing Networks, 8 pages, School of Aerospace, Mechanical and Mechatronic Engineering, Australian Centre for Field Robotics, University of Sydney 2006 NSW Australia.
Nicholson, et al., Scalable Distributed Data Fusion, ISIF 2002, pp. 630-635.
Upcroft, et al., Rich Probabilistic Representations for Bearing Only Decentralised Data Fusion, 8 pages, ARC Centre of Excellence for Autonomous Systems, Australian Centre for Field Robotics, Universiyt of Sydney, NSW, Australia 2006.

(Continued)

*Primary Examiner*—Eliseo Ramos Feliciano
*Assistant Examiner*—Phuong Huynh

(57) ABSTRACT

A method for parameterization of data distributions for efficient information sharing in distributed sensor networks including a plurality of sensors, comprising the steps of performing Bayesian multi-source data fusion and sharing probalistic data information.

17 Claims, 19 Drawing Sheets

OTHER PUBLICATIONS

Chen, et al., Registration of Multimodal Brain Images: Some Experimental Results, Sensor Fusion: Architectures, Algorithms, and Applications VI, Belur V. Dasarathy, Editor, Proceedings of SPIE, vol. 4731 (2002), pp. 122-133.

Ramberg, et al., An Approximate Method for Generating Asymmetric Random Variables, Communications of the ACM, Feb. 1974, vol. 17,. No. 2, pp. 78-82.

Durrant-Whyte, et al., Data Fusion in Decentralised Sensing Networks, pp. 1-9, http://www.acfr.usyd.edu.au, Australian Centre for Field Robotics, University of Sydney NSW 2006.

Ong, et al., Decentralised Data Fusion with Particles, www.cas.edu.au, ARC Centre of Excellence in Autonomous Systems (CAS), The University of Sydney, Australia, 10 pages.

Ridley, et al., Decentralised Data Fusion with Parzen Density Estimates, pp. 161-166, 2004 IEEE 0-7803-8894-1/04, ISSNIP 2004.

Rosencrantz, et al., Decentralized Sensor Fusion with Distributed Particle Filters, 8 pages, School of Computer Science, Carnegie Mellon University, Pittsburg, PA 15213.

Chen, et al., Performance of Mutual Information Similarity Measure for Registration of Multitemporal Remote Sensing Images, IEEE Transactions on Geoscience and Remote Sensing, vol. 41, No. 11, Nov. 2003, pp. 2445-2454.

Gordon, et al., Novel Approach to Nonlinear/Non-Gaussian Bayesian State Estimation, IEE Proceedings-F, vol. 140, No. 2, Apr. 1993, pp. 107-113.

Chen, et al., Mutual Information-Based CT-MR Brain Image Registration Using Generalized Partial Volume Joint Histogram Estimation, IEEE Transactions on Medical Imaging, vol. 22, No. 9, Sep. 2003, pp. 1111-1119.

Mykytka, et al., Fitting a Distribution to Data Using an Alternative to Moments, 1979 IEEE, Winter Simulation Conference, Dec. 3-5, 1979, pp. 361-374.

Singer, Estimating Optimal Tracking Filter Performance for Manned Maneuvering Targets, IEEE Transactions on Aerospace and Electronic Systems, vol. AES-6, No. 4, Jul. 1970, pp. 473-483.

Alexander, et al., Distributed Picture Compilation Demonstration, Signal Processing, Sensor Fusion, and Target Recognition XIII, edited by Ivan Kadar, Proceedings of SPIE, vol. 5429, pp. 439-445.

Sheng, et al., Distributed Particle Filter With GMM Approximation for Multiple Targets Localization and Tracking in Wireless Sensor Network, 0-7803-9201-9/05,2005 IEEE, pp. 181-188.

* cited by examiner

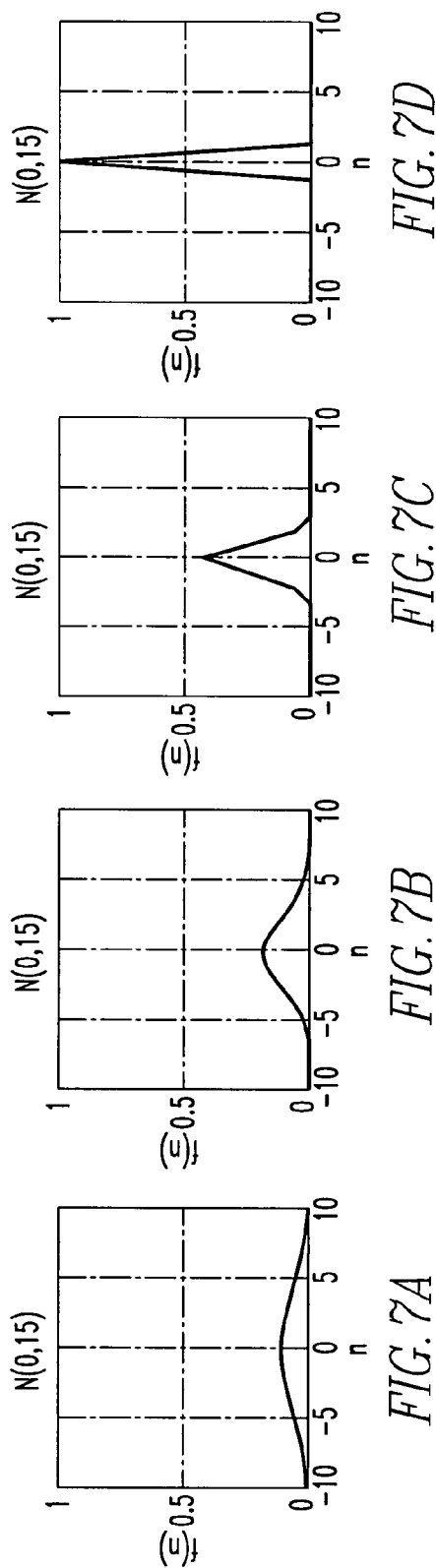

PARAMETERIZATION OF NON-LINEAR/NON-GAUSSIAN DATA DISTRIBUTIONS FOR EFFICIENT INFORMATION SHARING IN DISTRIBUTED SENSOR NETWORKS

CROSS REFERENCE TO RELATED APPLICATIONS

This application claims rights under 35 U.S.C.§119(e) from U.S. Application Ser. No. 60/850,463, filed Oct. 10, 2006, the contents of which are incorporated herein by reference.

STATEMENT OF GOVERNMENT INTEREST

The invention was made with United States Government support under Contract No. DAAD19-01-02-0008, awarded by the Department of the Army. The United States Government has certain rights in the invention.

BACKGROUND OF THE INVENTION

1. Field of the Invention

This invention relates to data fusion and more particularly to parameterization of non-linear/non-Gaussian data distributions for efficient information sharing in distributed sensor networks.

2. Brief Description of Prior Developments

In the field of multi-sensor data fusion, decentralized data fusion has become an attractive alternative to centralized data fusion primarily due to the inherent robustness and scalability features that decentralized architectures offer. In its most primitive form, a decentralized sensor network involves processing capability at each sensor—eliminating the need and subsequent vulnerability of a central processing node—along with the capacity for each sensor to efficiently communicate its information to neighboring sensors without requiring any knowledge of the network topology, as disclosed in H. Durrant-Whyte and M. Stevens, "Data Fusion in Decentralized Sensing Networks," *Proceedings of the 4th International Conference on Information Fusion*, 7-10 Aug. 2001, Montreal, Canada, the contents of which are incorporated herein by reference. To date, the majority of fielded implementations utilizing decentralized data fusion have relied on linear/Gaussian assumptions and the Kalman/information filter. The foregoing is disclosed in E. Nettleton, "Decentralised Architectures for Tracking and Navigation with Multiple Flight Vehicles," PhD Thesis, University of Sydney, February 2003; J. McClellan, G. Edelson and R. Chellappa, "The Listening Eye," *Proceedings of the 2004 Collaborative Technology Alliance Conference*, 5-7 May 2004, Washington D.C.; R. Alexander, J. Anderson, J. Leal, D. Mullin, D. Nicholson and G. Watson, "Distributed Picture Compilation Demonstration," *Proceedings of SPIE (Signal Processing, Sensor Fusion and Target Recognition XIII)*, Vol. 5429, 12-14 Apr. 2004; D. Dudgeon, G. Edelson, J. McClellan and R. Chellappa, "Listening Eye II," *Proceedings of the 2005 Collaborative Technology Alliance Conference*, 31 May-3 Jun. 2005, Crystal City, Va.; J. Broussard and M. Richman, "Decentralized Common Operating Picture Compilation in Support of Autonomous Cooperative Behaviors," *Proceedings of the 2005 Collaborative Technology Alliance Conference*, 31 May-3 Jun. 2005, Crystal City, Va., the contents of which are incorporated herein by reference. Even though such systems have produced impressive results, the natural desire to utilize a wider mixture of more complex sensor types—potentially exhibiting observation and/or process non-linearities along with non-Gaussian distributions—has generated a need for more generalized information fusion techniques. A variety of methods have been applied to the problem of non-linear/non-Gaussian decentralized data fusion in which the majority of such methods have been focused on particle filters, Gaussian mixture models or Parzen density estimators, or some combination of the two. The foregoing is disclosed in M. Rosencrantz, G. Gordon and S. Thrun, "Decentralized Sensor Fusion with Distributed Particle Filters," *Proceedings of the 19$^{th}$ Conference on Uncertainty in Artificial Intelligence*, 7-10 Aug. 2003, Acapulco, Mexico; M. Borkar, V. Cevher and J. H. McClellan, "A Monte-Carlo Method for Initializing Distributed Tracking Algorithms" *Proceedings of the 2006 International Conference on Acoustics, Speech and Signal Processing*, 14-19 May 2006, Toulouse, France; M. Ridley, B. Upcroft, L. L. Ong, S. Kumar and S. Sukkarieh, "Decentralised Data Fusion with Parzen Density Estimates," *Proceedings of the 2004 Intelligent Sensors, Sensor Networks and Information Processing Conference*, 14-17 Dec. 2004, Melbourne, Australia; B. Upcroft, L. L. Ong, S. Kumar, T. Bailey, S. Sukkarieh, and H. Durrant-Whyte, "Rich Probabilistic Representations for Bearing Only Decentralized Data Fusion," *Proceedings of the 8$^{th}$ International Conference on Information Fusion*, 25-29 Jul. 2005, Philadelphia, Pa; L. L. Ong, M. Ridley, B. Upcroft, S. Kumar, T. Bailey, S. Sukkarieh and H. Durrant-Whyte, "A Comparison of Probabilistic Representations for Decentralised Data Fusion," *Proceedings of the 2005 Intelligent Sensors, Sensor Networks, and Information Processing Conference*, 5-8 Dec. 2005, Melbourne, Australia; L. L. Ong, B. Upcroft, M. Ridley, T. Bailey, S. Sukkarieh and H. Durrant-Whyte, "Decentralized Data Fusion with Particles," *Proceedings of the 2005 Australasian Conference on Robotics and Automation*, 5-7 Dec. 2005, Sydney, Australia; X. Sheng, Y. Y. Hu and P. Ramanathan, "Distributed particle filter with GMM approximation for multiple targets localization and tracking in wireless sensor network," *Proceedings of the Fourth International Symposium on Information Processing in Sensor Networks*, pp. 181-188, 25-27 Apr. 2005, Los Angeles, Calif., the contents of which are incorporated herein by reference. All of the aforementioned techniques are capable of performing generalized estimation, however, not all techniques lend themselves well to decentralized applications as a result of the scalability concerns they inherently generate.

A need still exists, however, for a highly-scalable, Bayesian approach to the problem of performing generalized, multi-source data fusion and target tracking in decentralized sensor networks.

SUMMARY OF INVENTION

The present invention is a highly-scalable, Bayesian approach to the problem of performing multi-source data fusion and target tracking in decentralized sensor networks is presented. Previous applications of decentralized data fusion have generally been restricted to uni-modal/uni-source sensor networks using Gaussian based approaches, such as the Kalman or information filter. However, with recent interest to employ complex, multi-modal/multi-source sensors that potentially exhibit observation and/or process non-linearities along with non-Gaussian distributions, the need to develop a more generalized and scalable method of decentralized data fusion is required. The probabilistic approach featured in this invention provides the ability to seamlessly integrate and efficiently fuse multi-source sensor data in the absence of any linearity and/or normality constraints. The proposed architecture is fully decentralized and provides a methodology that scales extremely well to any growth in the number of targets or region of coverage. This disclosure will illustrate that our multi-source data fusion architecture is capable of providing high-precision tracking performance in complex, non-linear/non-Gaussian operating environments. In addition, we will also show that our architecture provides an unprecedented scaling capability for decentralized sensor networks as compared to similar architectures that communicate information using particle data, Gaussian mixture models or Parzen density estimators.

The present invention is a method for parameterization of data distributions for efficient information sharing in distributed sensor networks including a plurality of sensors, comprising the steps of performing Bayesian multi-source data fusion and sharing probalistic data information.

According to the present invention, the operations of a single decentralized data fusion (DDF) node as related to target tracking are as follows:

(a) Observations are collected corresponding to local image of fusion environment.

(b) Local target tracks are updated or initiated using collected observations.

(c) Local target tracks are communicated throughout sensor network.

(d) External target tracks received from other nodes are assimilated with local target tracks.

(e) Assimilated target tracks are propagated to time of next expected measurement.

BRIEF DESCRIPTION OF THE DRAWINGS

The present invention is further described with reference to the accompanying drawings wherein:

FIG. 3b is a schematic diagram of the software architecture of;

FIGS. 7a-7d consist of four graphs showing various GPVE kernels in a preferred embodiment of the present invention;

DETAILED DESCRIPTION OF THE PREFERRED EMBODIMENT

Figure 1:
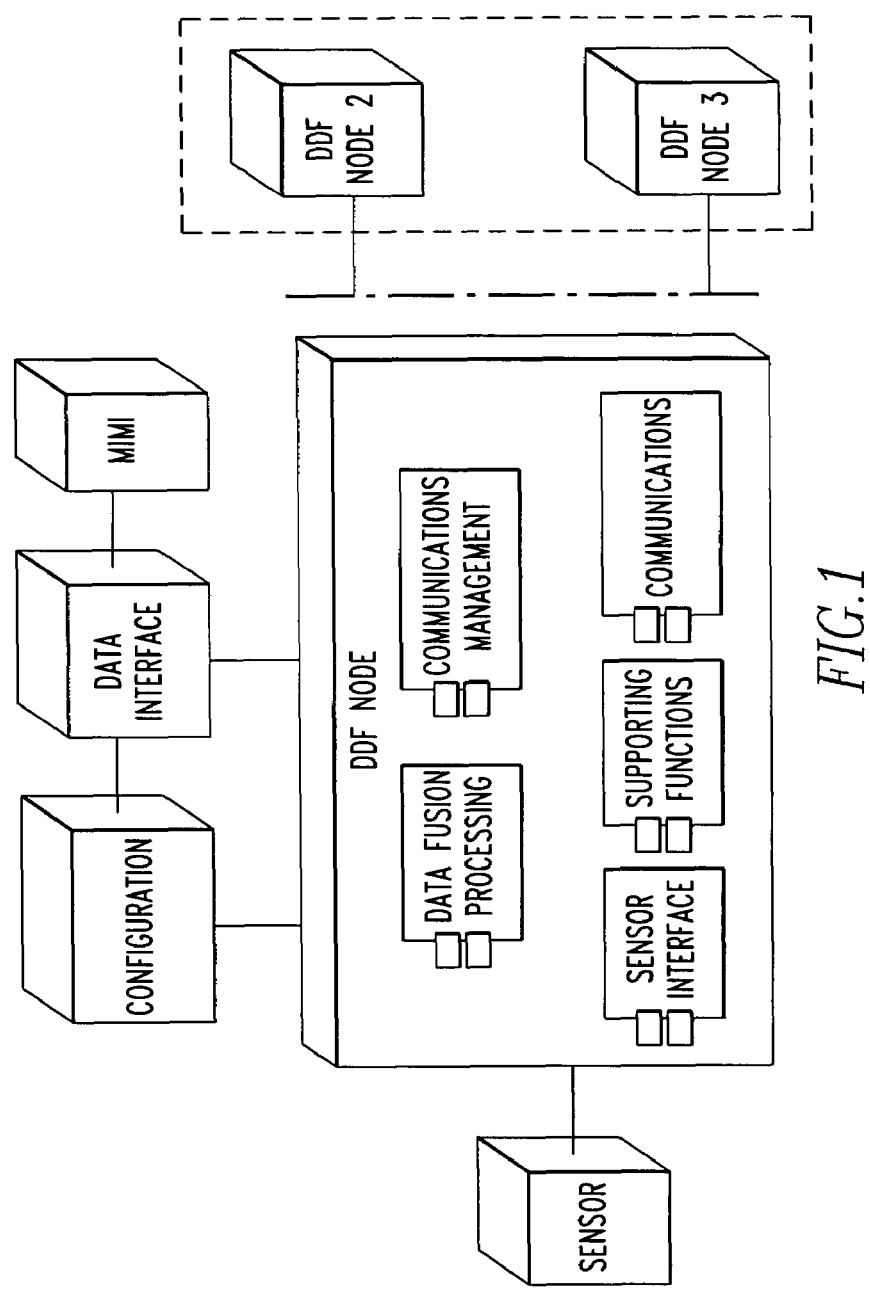
FIG. 1 is a block diagram showing DDF SDK, which is a data-fusion software architecture.

This disclosure presents a highly-scalable, Bayesian approach to the problem of performing generalized, multi-source data fusion and target tracking in decentralized sensor networks. A brief background of linear decentralized data fusion is first provided in Section 1, and performance results related to currently fielded linear decentralized data fusion implementations are provided in Section 2. Section 3 describes an approach to performing probabilistic decentralized data fusion, and corresponding simulated performance results are presented in Section 4. Section 5 summarizes the description.

1.0 Linear Decentralized Data Fusion 1.1 Data Fusion in Sensor Networks

When formulated from a Bayesian standpoint, the data fusion problem is to recursively compute the posterior probability density function (PDF) of the state of interest xk at time step k, using the measurement set $Z^k = \{z_j, j=1, 2, \ldots, k\}$; this can be calculated using Bayes rule $$p(x_k | Z^k) = \frac{p(z_k | x_k) p(x_k | Z^{k-1})}{p(z_k | Z^{k-1})} \quad (1.1.1)$$

where p(zk|xk) is the measurement likelihood and p(xk|Zk−1) is the predicted PDF at time k computed according to (1.1.2). The denominator of (1.1.1) acts as a normalization factor.

$$p(x_k | Z^{k-1}) = \int p(x_k | x_{k-1}) p(x_{k-1} | Z^{k-1}) dx_{k-1} \quad (1.1.2)$$

When the underlying target distribution and likelihood are assumed to be Gaussian, equations (1.1.1), (1.1.2) reduce to the Kalman filter and its Information filter equivalent. The Kalman filter is disclosed in M. Arulampalam, S. Maskell, N. Gordon and T. Clapp, "A Tutorial on Particle Filters for Online Nonlinear/Non-Gaussian Bayesian Tracking," *IEEE Transactions on Signal Processing*, Vol. 50, No. 2, pp. 174-188, February 2002; the contents of which are incorporated herein by reference.

To allow the global state estimate to be computed in a decentralized system, where only communication with nearest neighbors is allowed, nodes must communicate their own data and data received from other sensors. Care must be taken to prevent nodes receiving data along multiple paths. If not correctly handled the re-fusion of information in this way gives rise to the rumor propagation problem that can seriously degrade the quality of fusion as is disclosed in D. Nicholson, C. Lloyd, S. Julier and J. Uhlmann, "Scalable distributed data fusion," *Proceedings of the 5th International Conference on Information Fusion*, 8-11 Jul. 2002, Annapolis, Md.; the contents of which are incorporated herein by reference. It is also desirable that each node should not have to record the provenance of every piece of information generated by any sensor. For tree connected communication networks the solution to this problem is the Channel filter as is disclosed in M. Ridley, E Nettleton, S. Sukkarieh and H. Durrant-Whyte, "Tracking in Decentralised Air-Ground Sensing Networks," *Proceedings of the 5th International Conference on Information Fusion*, 8-11 Jul. 2002, Annapolis, Md.; the contents of which are incorporated herein by reference. The Channel filter is a probability distribution conditioned on the common information held between a pair of nodes. When Channel filters are used to identify redundant information, only posterior distributions need to be transmitted between nodes. This allows the computation of the global posterior without sending measurements or provenance information.

If nodes a and b communicate their information, the updated estimate can be calculated as the product of their distributions divided by the common information.

$$p(x_k | Z_k^a \cup Z_k^b) = \frac{p(x_k | Z_k^a) p(x_k | Z_k^b)}{p(x_k | Z_k^a \cap Z_k^b)} \qquad (1.1.3)$$

When the underlying distributions are Gaussian, the channel filter is also an Information filter. Importantly, since information is additive, redundant information can be removed by subtraction. A discrete time model of a linear system $x_k = [x_1, x_2, \ldots, x_n]$, $x_i \in \Re$ is given by (1.1.4).

$$x_k = F_k x_{k-1} + G_k w_k \qquad (1.1.4)$$

$$z_k = H_k x_k + v_k \qquad (1.1.5)$$

where $F_k$ is the state transition model; $G_k$ projects the noise vector into the state, and $w_k$ is a zero-mean, white noise vector with covariance $Q_k$. An observation of the state is made according to (2.1.5) where $V_k$ is a zero mean white noise vector with covariance $R_k$.

For such a system the Kalman filter produces an optimal estimate $\hat{x}(k|k)$ of the true state $x(k)$ and an associated covariance $P(k|k)=E[(\hat{x}(k|k)-x(k))'(\hat{x}(k|k)-x(k))]$ using the measurement set Zk. The Kalman filter equations can be written in information form by introducing the identities (1.1.6) for the information vector and information matrix respectively.

$$y(k|k) = P(k|k)^{-1} \hat{x}(k|k)$$

$$Y(k|k) = P(k|k)^{-1} \qquad (1.1.6)$$

The Kalman filter update in information space is a simple addition of the predicted information matrices and vectors and the measurement written in information form (1.1.7), (1.1.8). The predicted densities can be calculated by converting the predicted state space (1.1.9) estimate to information space.

$$y(k|k) = y(k|k-1) + i(k)$$

$$Y(k|k) = Y(k|k-1) + I(k) \qquad (1.1.7)$$

$$i(k) = H_k' R_k^{-1} z_k$$

$$I(k) = H_k' R_k^{-1} H_k \qquad (1.1.8)$$

$$\hat{x}(k|k-1) = F_k \hat{x}(k-1|k-1)$$

$$P(k|k-1) = F_k P(k-1|k-1) F_k' + G_k Q_k G_k' \qquad (1.1.9)$$

The track-to-track update can now be written as the sum of information vectors and matrices, minus the channel filter (1.1.10).

$$y(k|k)^+ = y_a(k|k) + y_b(k|k) - y_{ab}(k|k-1)$$

$$Y(k|k)^+ = Y_a(k|k) + Y_b(k|k) - Y_{ab}(k|k-1) \qquad (1.1.10)$$

The channel filter is then updated to account for the new common information (2.1.11).

$$y_{ab}(k|k) = y(k|k)^+$$

$$Y_{ab}(k|k) = Y(k|k)^+ \qquad (1.1.11)$$

Unfortunately, the channel filter can only be used in single connected networks. For arbitrary networks the Covariance Intersection (CI) algorithm can be used as is disclosed in S. J. Julier and J. K. Uhlmann, "A Non-divergent Estimation Algorithm in the Presence of Unknown Correlations," *Proceedings of the IEEE American Control Conference*, Vol. 4, pp. 2369-2373, June 1997, Albuquerque, N.Mex.; the contents of which are incorporated herein by reference. The CI algorithm is a convex combination of the information vectors and matrices.

$$y(k|k)^+ = \omega y_a(k|k) + (1-\omega) y_b(k|k)$$

$$Y(k|k)^+ = \omega Y_a(k|k) + (1-\omega) Y_b(k|k) \qquad (1.1.12)$$

where $\omega \in [0,1]$ is a free parameter to be optimized, typically to maximize the determinant of the resultant information matrix. The CI algorithm gives an estimate that is guaranteed to be consistent in the sense that the covariance is greater than the expected error. CI thus gains additional flexibility at the expense of optimality.

2.0 Linear DDF—Fielded Performance Results 2.1 DDF Software Development Kit

The operations of a Decentralised Data Fusion (DDF) node, those of predict, update, communicate and assimilate, are independent of the underlying representation of the probability distribution. To facilitate the development and demonstration of novel DDF techniques, this independence has been exploited to develop a DDF Software Development Kit (SDK). Illustrated in FIG. 1, the DDF SDK provides an overall DDF architecture with configuration, sensor and communication layer interfaces and support functions in an object-orientated framework written in C++. Initially the SDK utilized Kalman/Information filters, however the software has been written in a sufficiently general manner that any suitable representation such as particles or mixtures of Gaussians can be added.

2.2 Closed Loop Control

Figure 2A:
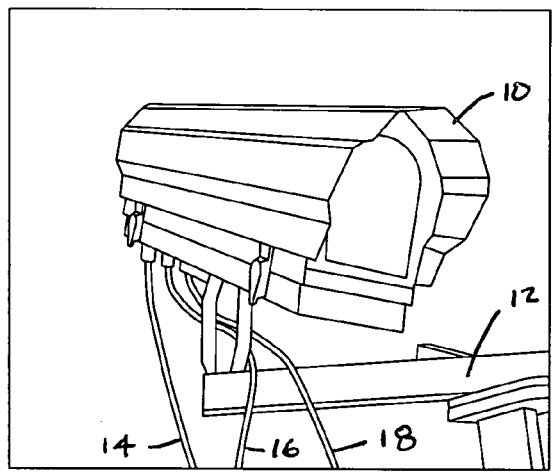
FIG. 2a is a perspective view of a CCTV camera used in the practice.
Figure 2B:
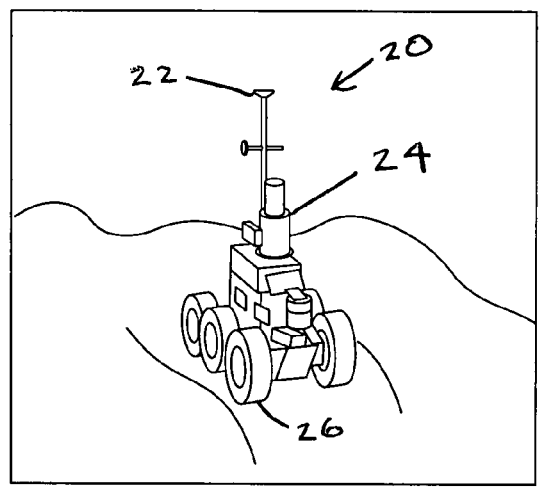
FIG. 2b is a perspective view of a RoboVolc used in the practice of a preferred embodiment of the present invention.
Figure 2C:
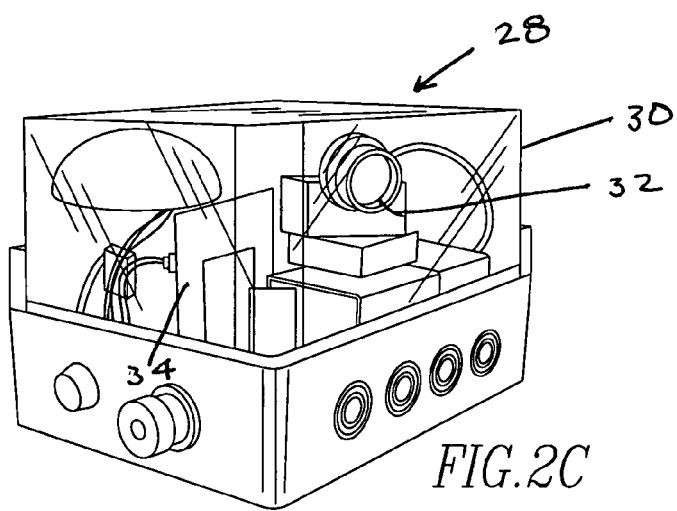
FIG. 2c is a perspective view of a UGS sensor used in the practice of a preferred embodiment of the present invention.

The DDF Software Development Kit (SDK) has been used to develop a real time closed loop sensor-to-actor control demonstration. The system integrates ATC CCTV cameras (FIG. 2a), Robovolc mobile robotic capability (FIG. 2b) and Unattended Ground Sensors (UGS) (FIG. 2c). Referring particularly to FIG. 2a, there is a CCTV camera 10, a mounting mast 12, and control cables 14, 16, and 18. The CCTV camera 10 provides imagery data for input to the DDF SDK for multi-source data fusion. Referring particularly to FIG. 2b, the unattended ground vehicle (UGV) 20 includes an antenna/communications assembly 22, a sensor assembly 24, and multi-terrain wheels as at 26. The UGV 20 houses sensing capabilities (range/bearing/video) for input to the DDF SDK for multi-source data fusion. Referring particularly to FIG. 2c, an unattended ground sensor (UGS) 28 includes a weatherproof container 30, a sensor assembly 32, and an antenna/communications assembly 34. The UGS 28 houses sensing capabilities (range/bearing) used for multi-source data fusion. The scenarios considered were used to demonstrate the advantages of DDF within a heterogeneous sensor network in an end-to-end system that encompassed all sections of the OODA loop (Observe, Orient, Decide, and Act).

The actuator was the Robovolc robot, the decision was which target(s) to intercept and when, and the orient stage involved both the physical orientation of the robot, and the sensor-to-target allocation for steer-able sensors.

Figure 3A:
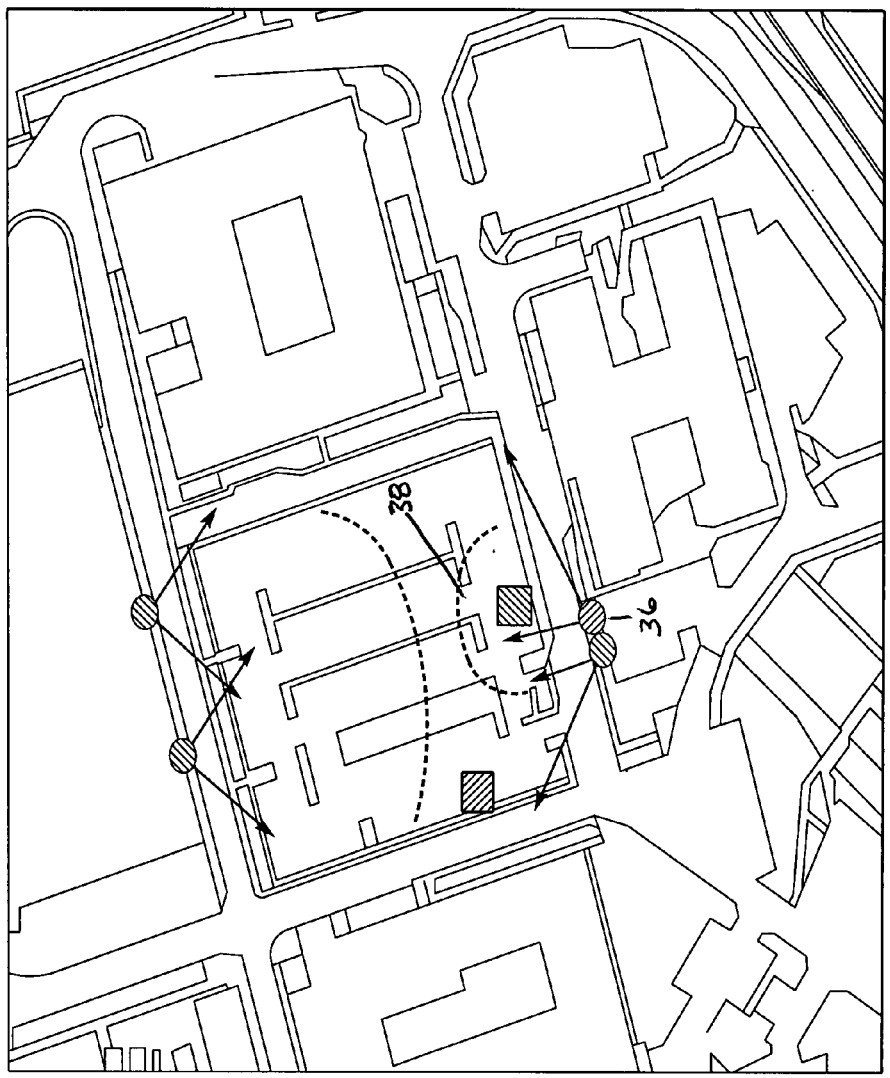
FIG. 3a is a schematic diagram of the operational setup of the preferred embodiment of the present invention.
Figure 3B:
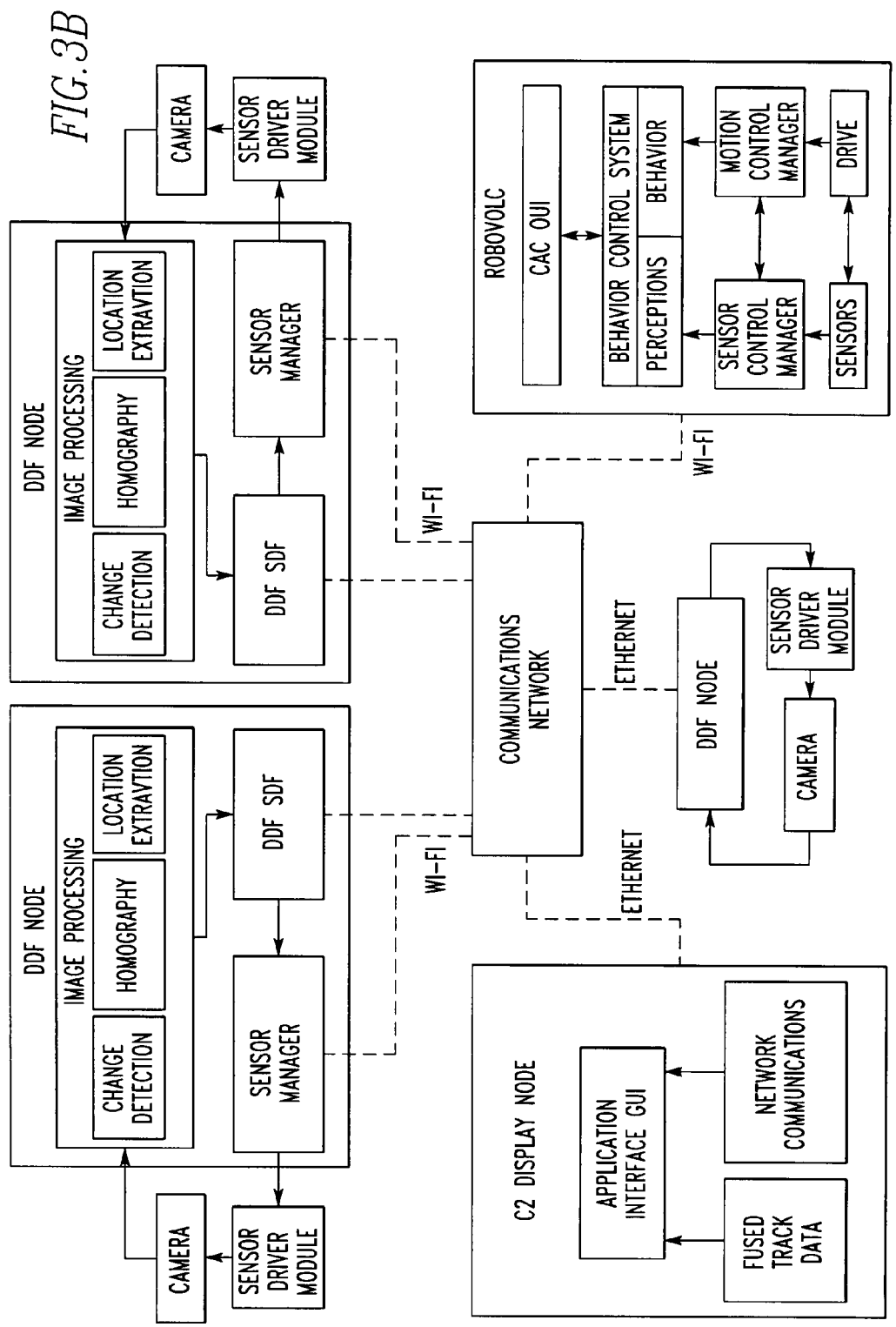

The scenarios were representative of a number of military scenarios including UAV reconnaissance/surveillance, anti-submarine warfare, urban asymmetrical warfare and mine counter measures. FIG. 3a shows a sample set-up. In the scenarios, pedestrians in the 9K car park give rise to tracks in the Common Operating Picture (COP). Robovolc, accessing a single DDF node associated with a CCTV camera 36, defends a 'sensitive' region of the car park 38 against intrusion. Robovolc defends a region from intrusion by physically interposing itself in the path of targets that appear to threaten the region. Once a pedestrian has been intercepted, Robovolc then returns to guarding the region. Robovolc moves to interception points supplied to it by software that sits between DDF and Robovolc (FIG. 3b). This software analyses the DDF tracks and instructs Robovolc accordingly. The instruction to move is triggered by a target crossing an outer boundary shown in FIG. 3a.

The UGS sensor (FIG. 2c) was able to detect targets using its ultrasound tripwire while running the SDK DDF software at an acceptable rate indicating its ability to participate in a network as a full DDF sensor node.

Figure 4A:
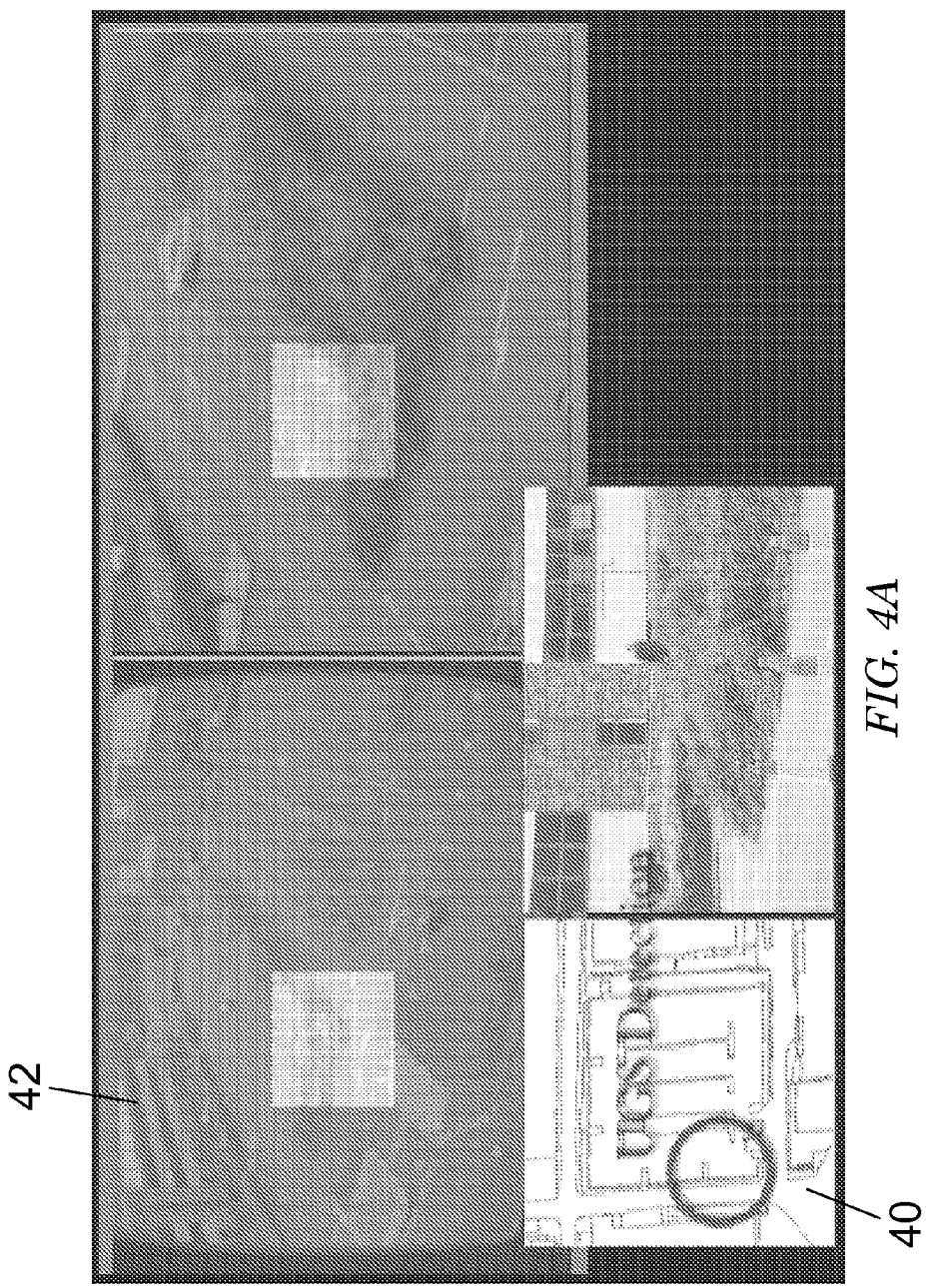
FIGS. 4a and 4b are plan views which demonstrate the USG used as a trip wire to cue the CCTV FOV, with the latter being the light-gray squares in a preferred embodiment of the present invention.
Figure 4B:

In addition to the DDF tracking, sensor management was implemented across the network. Multi-sensor management using Decentralized Decision Making (DDM) algorithms was implemented across two steer-able sensors to provide a globally optimal sensor to target allocation. The manageable sensor was mimicked in software by only processing a subset of the cameras' Field Of View (FOV). This resulted in a narrower but steered FOV. The sensor management software controls the pointing of these software-steered cameras with a view to optimizing the ability of Robovolc to defend the area. The results are drawn from analysis of the data collected during two experimentation periods, one for each implementation. The measures of effectiveness are drawn from the SIAP measures, as is disclosed in SIAP SE TF Technical Report 2001-001: Single Integrated Air Picture (SIAP) Attributes. (2001, June). Arlington, Va.: SIAP SE TF; the contents of which are incorporated herein by reference. The relevant SIAP measure is completeness, and the relevant system metric is the number of successful (timely) intercepts. FIGS. 4a and 4b illustrate two still images from the demonstration video. In the upper right and left corners, the steerable camera FOVs are shown as light grey squares as at 40. The lower left corner illustrates a plan view as at 42 showing the tracked target means and covariances.

3.0 Probalistic Decentralized Data Fusion

When applying linear decentralized data fusion to the problem of target tracking, a common observability/fusion platform in position space is typically required by all sensors in the network, whether it be in a spherical or Cartesian coordinate system. However, when multi-source sensors operating in disparate observability/fusion spaces are used to populate a network, a common platform for fusion no longer exists, and the linear decentralized data fusion algorithms must be abandoned for a more generalized estimation approach.

Figure 5:
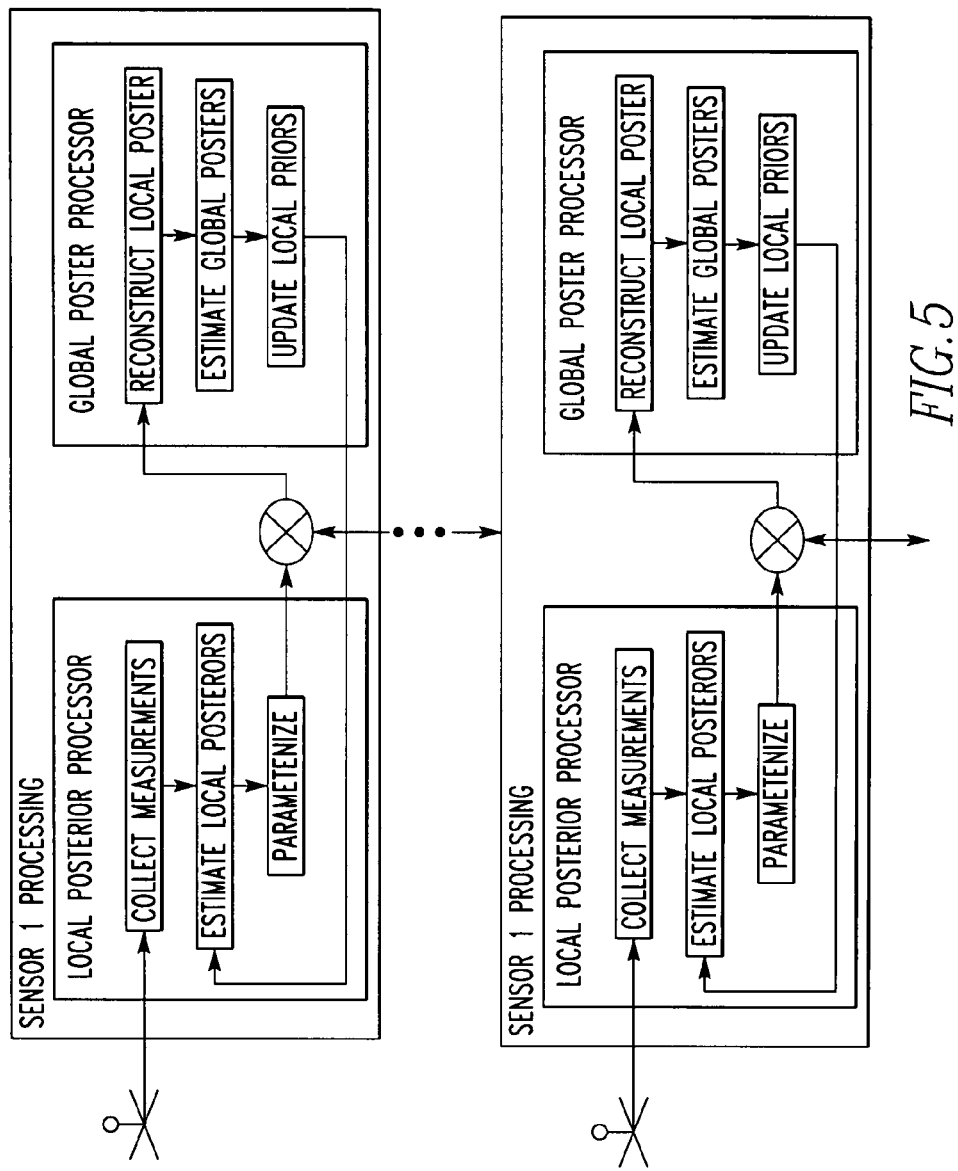
FIG. 5 is a diagram of the probabilistic decentralized data fusion architecture in a preferred embodiment of the present invention.
Figure 6A:
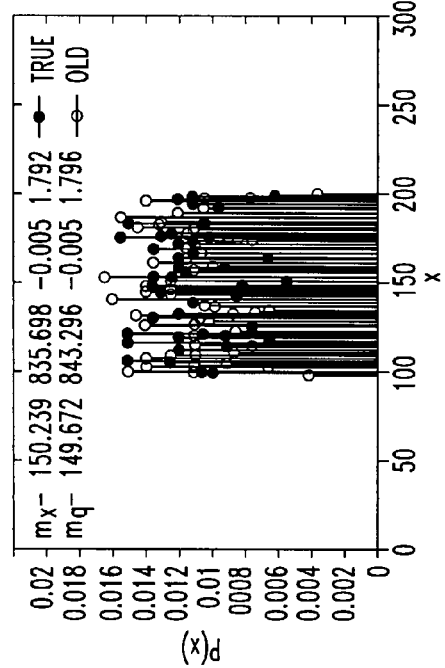
FIGS. 6a-6d consist of four graphs showing the GLD estimation of various uni-modal distributions of a preferred embodiment of the present invention.
Figure 6C:
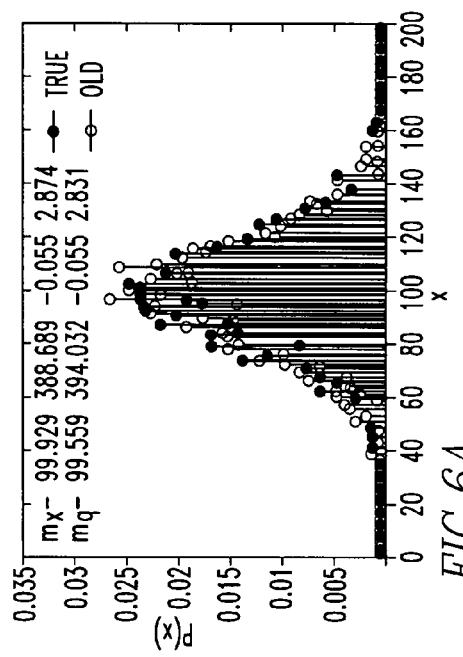
Figure 6B:
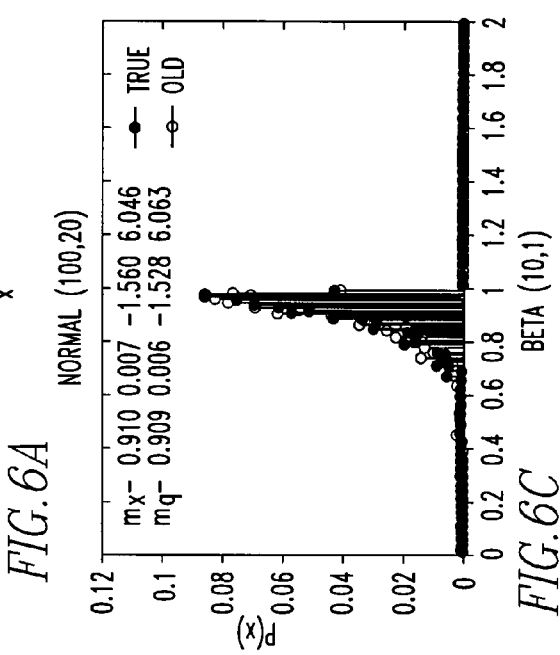
Figure 6D:
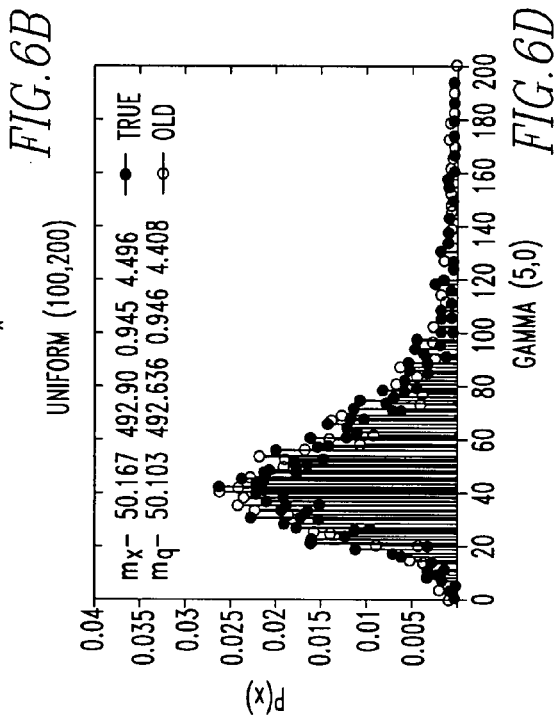
Figure 8A:
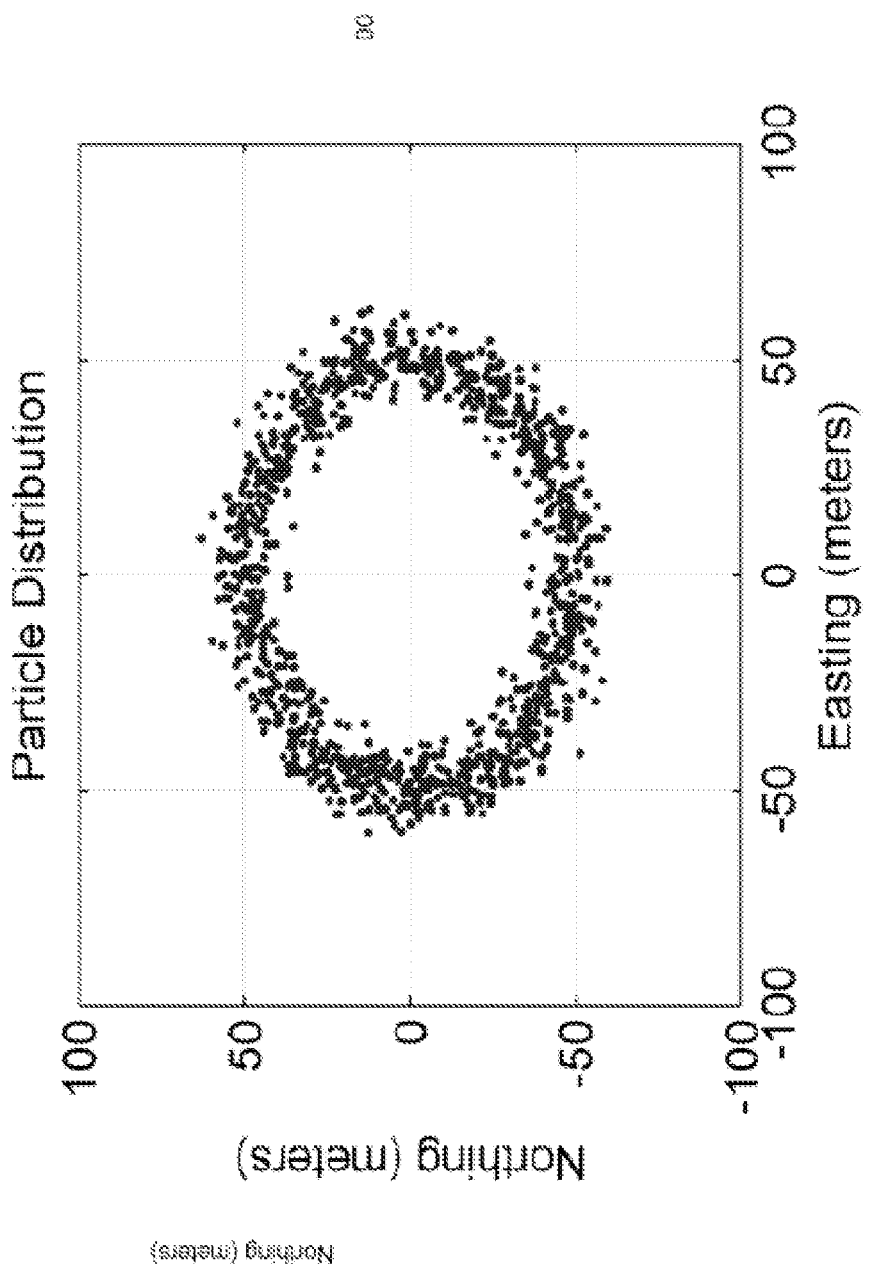
FIGS. 8a-8d are graphs showing a joint histogram estimation of range-only particle distribution in a preferred embodiment of the present invention.
Figure 8B:
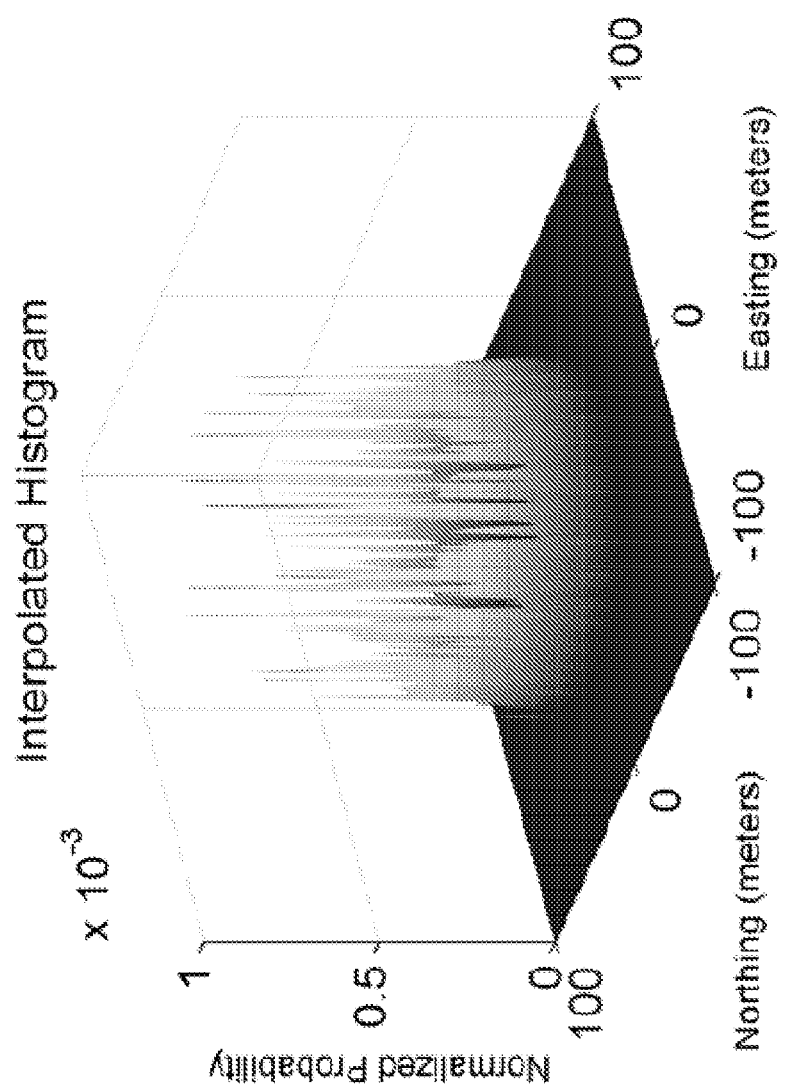
Figure 8C:
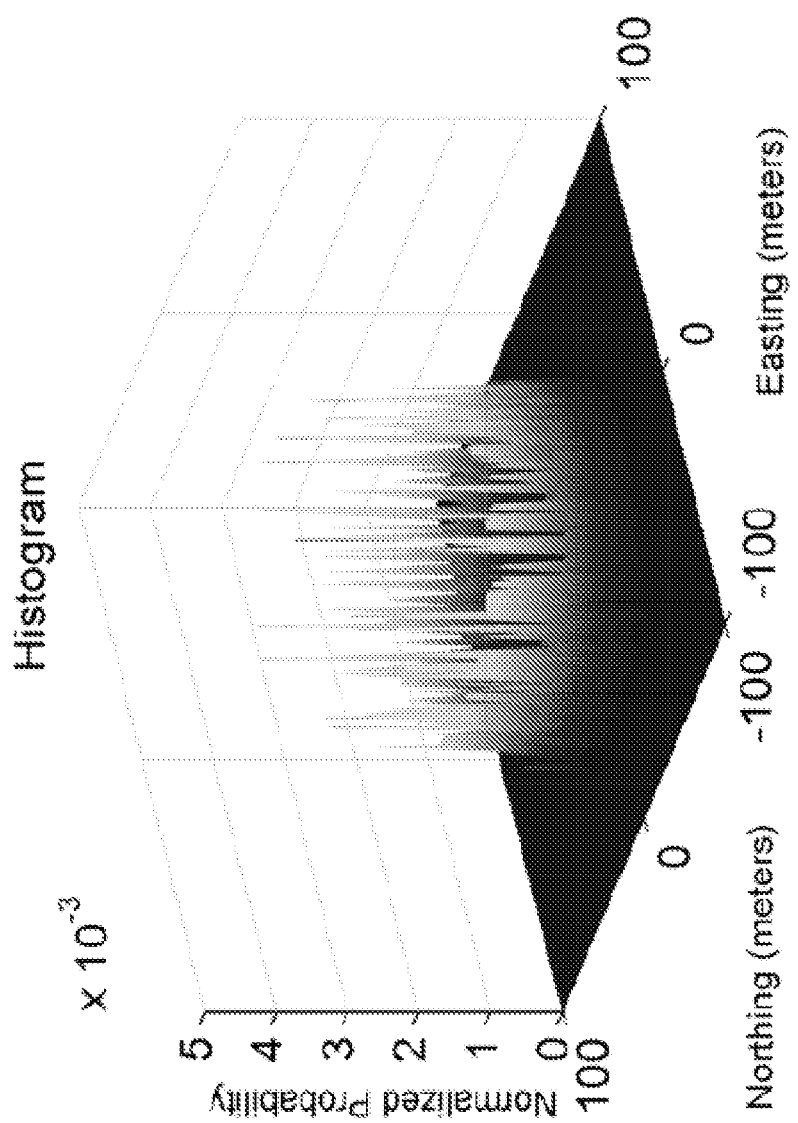
Figure 8D:
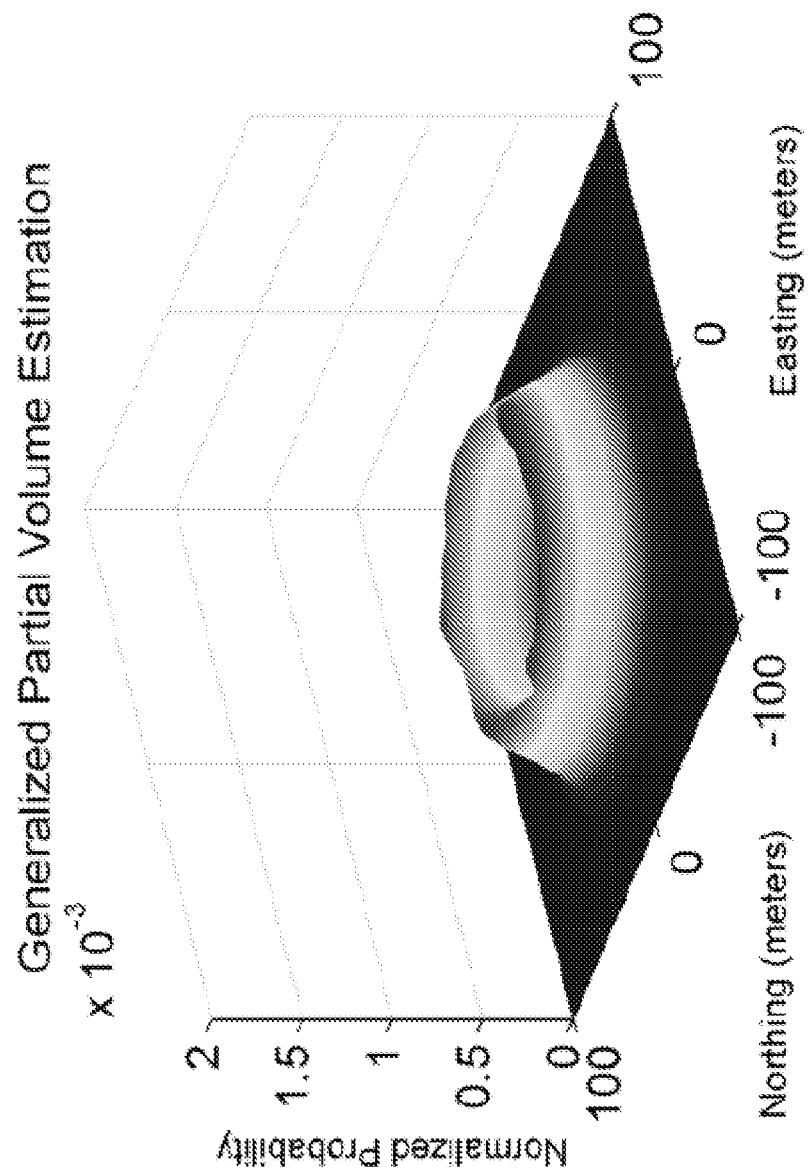

A generalized, probabilistic approach to performing multi-source data fusion and target tracking in decentralized sensor networks is illustrated in FIG. 5. The proposed architecture provides the ability to seamlessly integrate and efficiently fuse multi-source sensor data in the absence of any linearity and/or normality constraints. In addition, the architecture is fully decentralized and provides a methodology that scales extremely well to any growth in the number of targets or region of coverage. The primary components of the described architecture are discussed in detail in the subsequent sections.

3.1 Particle Filters

The decentralized probabilistic approach outlined in FIG. 5 utilizes particle filters to estimate the local posterior densities for each sensor. As described in the seminal paper N. J. Gordon, D. J. Salmond and A. F. M. Smith, "Novel approach to nonlinear/non-Gaussian Bayesian state estimation," *IEEE Proceedings F—Radar & Signal Processing*, Vol. 140, no. 2, pp. 107-113, April 1993; the contents of which are incorporated by reference along with others such as M. Orton and W. Fitzgerald, "A Bayesian Approach to Tracking Multiple Targets Using Sensor Arrays and Particle Filters," *IEEE Transactions on Signal Processing*, Vol. 50, No. 2, pp. 216-223, February 2002; the contents of which are incorporated herein by reference, particle filters are based upon point mass representations of probability densities which can be applied to any state-space model in the absence of linearity and/or normality constraints. In the same way that a Kalman filter provides the optimal Bayesian estimate for the highly-restricted linear, Gaussian environment, a particle filter can be thought of as approximating the optimal Bayesian recursion without having to impose any linear model or noise distribution constraints.

The basic idea behind the particle filter is that the posterior density of interest is represented by a set of weighted particles, each of which forms an independent hypothesis for the state at a given time. If the weights are chosen correctly, this weighted set of particles becomes representative of the true posterior density in that expectations of the true posterior can be made arbitrarily close to the equivalent expectations of the set of weighted particles.

In order to describe its operation, assume that a particle set of size N is being used to approximate the posterior density of a state vector, $X_k$, based upon the set of all available measurements $Z_k=\{z_j, j=1, 2, \ldots, k\}$. At iteration k−1, the posterior density, $p(x_{k-1}|Z^{k-1})$, is represented by a set of particle values $(x^1_{k-1}, x^2_{k-1}, \ldots, x^N_{k-1})$ and associated weights $(w^1_{k-1}, w^2_{k-1}, \ldots, w^N_{k-1})$. At the next iteration, a new set of particle values $(x^1_k, x^2_k, \ldots, x^N_k)$ and associated weights $(w^1_k, w^2_k, \ldots, w^N_k)$ which characterize the posterior density, $p(x_k|Z^k)$, can be determined as follows:

$$x^j_k \sim p(x_k | x^j_{k-1}) \quad (3.1.1)$$

$$w^j_k = \frac{p(z_k | x^j_k) w^j_{k-1}}{\sum_{i=1}^{N} w^i_{k-1} p(z_k | x^i_k)} \quad (3.1.2)$$

where $p(x_k|x^i_{k-1})$ is the transition density and $p(z_k|x^i_{k-1})$ is the likelihood function. Comparing (3.1.2) with (3.1.1) it can be seen that for a given particle, $$w_{k-1}^i = p(x_k^i|Z^{k-1}) \quad (3.1.3)$$

$$w_k^i p(x_k^i|Z^k). \quad (3.1.4)$$

As a result, from (1.1.1), (3.1.3) and (3.1.4), it is observed that the weights of a particle filter represent the prior and posterior densities corresponding to each particle's estimate of the state vector. Consequently, an overall estimate for the true posterior density can be theoretically obtained from the particle ensemble.

3.2 Estimating Local Posteriors

In this invention, range-only, bearing-only and range/bearing sensors are evaluated for multi-source, decentralized data fusion in which particle filters are used to estimate the local posteriors in range/bearing space for all sensor types. The measurement vector, measurement covariance and particle filter state vector used for all sensor types are defined as $$\underline{z}_k = [z_{r,k} z_{\theta,k}]', \quad R_k = \text{diag}(\sigma_{z_{r,k}}^2 \sigma_{z_{\theta,k}}^2), \quad \underline{x}_k = [r_k \theta_k \dot{r}_k \dot{\theta}_k]' \quad (3.2.1)$$

Using (3.2.1), a generalized likelihood function can be defined as the product of the individual range/bearing likelihoods for a given sensor type as follows:

1. Range-Only Sensor—$p(\underline{z}_k|\underline{x}_k) = p(z_{r,k}|\underline{x}_k)p(z_{\theta,k}|\underline{x}_k) = N(z_{r,k}, \sigma_{z_{r,k}}^2)U(\theta_{min}, \theta_{max})$ 2. Bearing-Only Sensor—$p(\underline{z}_k|\underline{x}_k) = p(z_{r,k}|\underline{x}_k)p(z_{\theta,k}|\underline{x}_k) = U(r_{min}, r_{max})N(z_{\theta,k}, \sigma_{z_{\theta,k}}^2)$ 3. Range/Bearing Sensor—$p(\underline{z}_k|\underline{x}_k) = p(z_{r,k}|\underline{x}_k)p(z_{\theta,k}|\underline{x}_k) = N(z_{r,k}, \sigma_{z_{r,k}}^2)N(z_{\theta,k}, \sigma_{z_{\theta,k}}^2)$ (3.2.2)

where $N(z,\sigma^2)$ corresponds to a normal distribution with mean z and variance $\sigma^2$, and $U(\alpha_{min}\alpha_{max})$ corresponds to a uniform distribution over the region $\alpha_{min}$ to $\alpha_{max}$.

The generalized transition density used for this invention is based on a zero-mean, first-order Markov model as is disclosed in R. A. Singer, "Estimating Optimal Tracking Filter Performance for Manned Maneuvering Targets," *IEEE Transactions on Aerospace and Electronic Systems*, Vol. AES-6, No. 4, pp. 473-483, July 1970, the contents of which are incorporated herein by reference, and is defined by the following state transition matrix and process noise covariance $$\Phi = \begin{bmatrix} 1 & 0 & \tau_r(1-e^{-\Delta t/\tau_r}) & 0 \\ 0 & 1 & 0 & \tau_\theta(1-e^{-\Delta t/\tau_\theta}) \\ 0 & 0 & e^{-\Delta t/\tau_r} & 0 \\ 0 & 0 & 0 & e^{-\Delta t/\tau_\theta} \end{bmatrix}, \quad (3.2.3)$$

$$Q_k = \begin{bmatrix} 2\sigma_r^2/\tau_r & 0 & 0 & 0 \\ 0 & 2\sigma_\theta^2/\tau_\theta & 0 & 0 \\ 0 & 0 & 2\sigma_r^2/\tau_r & 0 \\ 0 & 0 & 0 & 2\sigma_\theta^2/\tau_\theta \end{bmatrix}$$

$$\begin{bmatrix} \Delta t^3/3 & 0 & \Delta t^2/2 & 0 \\ 0 & \Delta t^3/3 & 0 & \Delta t^2/2 \\ \Delta t^2/2 & 0 & \Delta t & 0 \\ 0 & \Delta t^2/2 & 0 & \Delta t \end{bmatrix}$$

where $\tau_r$, $\tau_\theta$, and $\sigma_\theta$ are tunable parameters related to the expected target motion in range/bearing space—each of which can assume different values depending upon the amount and type of fusion which has occurred for a specific posterior.

Applying the generalized likelihood function and transition density defined in (3.2.2) and (3.2.3) to (3.1.1) and (3.1.2), the particle filter is observed to provide a consistent method of local posterior estimation for the multi-source sensor types evaluated in this invention.

3.3 Parameterizing Local Posteriors

Communication of information is paramount for any form of distributed data fusion. Consequently, a fundamental requirement for decentralized fusion is efficient scaling of communicated information relative to any growth in the number of targets or region of coverage. To date, the majority of methods investigated for communicating information in decentralized architectures have been focused on particle set optimization, Gaussian mixture models or Parzen density estimators or some combination of the two. All of these methods, however, are prone to scalability concerns as the number of particles, GMM components or Parzen components required to adequately estimate and/or reconstruct posteriors of interest necessitate considerable increase as the number of targets or region of coverage escalate. Our solution to this scalability concern is rooted in high-order statistics and the generalized lambda distribution (GLD)—a four-parameter probability distribution whose density function can assume a wide variety of uni-modal, symmetric and/or asymmetric shapes, as is disclosed in J. S. Ramberg and B. W. Schmeiser, "An Approximate Method for Generating Asymmetric Random Variables," *Communications of the ACM*, Vol. 17, No. 2, pp. 78-82, February 1974; E. F. Mykytka and J. S. Ramberg, "Fitting a Distribution to Data Using an Alternative to Moments," *Proceedings of the 11th Winter Simulation Conference*, pp. 362-374, 3-5 Dec. 1979, the contents of which are incorporated herein by reference. The uni-modal limitation of the generalized lambda distribution prevents true, decentralized multi-modal estimation. However, for applications such as target tracking where a uni-modal assumption for the marginal distributions of interest may not be too erroneous, the generalized lambda distribution provides an intermediate solution to the decentralized scalability concern until a comparable multi-modal version can be developed.

Derived from Tukey's original lambda distribution defined by the quantile function $$Q(u) = \begin{cases} u^\lambda - (1-u)^\lambda, & \lambda \neq 0 \\ \dfrac{\log(u)}{(1-u)}, & \lambda = 0 \end{cases} \quad (3.3.1)$$

for 0=u=1, the generalized lambda distribution parameterizes (3.3.1) as follows $$Q(u) = \lambda_1 + \frac{u^{\lambda_3} - (1-u)^{\lambda_4}}{\lambda_2} \quad (3.3.2)$$

where $\lambda_1$ acts as a location parameter, $\lambda_2$ acts as a scale parameter, and the combination of $\lambda_3$ and $\lambda_4$ jointly capture the shape of the empirical distribution. The foregoing is disclosed in J. W. Tukey, Technical Report 36, Statistical Techniques Research Group, Princeton University, 1960, the contents of which are incorporated herein by reference.

In order to describe a probability distribution using the generalized lambda distribution, the $\lambda$-parameters are typically matched to the first four moments of a desired data distribution using a methodology similar to the one outlined. FIG. 6 illustrates the ability of the generalized lambda distribution to accurately estimate various uni-modal data distributions. The first four moments of the original data distribution and those of the GLD distribution are annotated on each plot. From FIGS. 6a-6d, the mean percent moment error is observed to be less than 1% for all GLD estimated distributions.

Table 1, taken from the above cited Ong et al, references and slightly modified illustrates the bandwidth requirements for communicating a particle set, a GMM approximation of a particle set, a Parzen density approximation of a particle set, and a GLD approximation of a particle set Those skilled in the art will appreciate that 20 GMM components and 50 Parzen components are required to adequately approximate a set of 2000 particles. Extending these parameters as hard limits for accurate posterior representation and noting that the GLD requires 4 components per dimension of the state vector, Table 1 illustrates the number of posteriors that can be accurately estimated for a given state vector dimensionally and a given amount of available bandwidth using the following formula:

$$\begin{array}{l}\text{Number of}\\ \text{Posteriors}\\ \text{Accurately}\\ \text{Communicated}\end{array} = \frac{\text{Available Bandwidth(floats)}}{\left(\frac{\text{Required}}{\text{Bandwidths(floats)}}\right)\left(\frac{\text{Required Components}}{\text{Accurate}}\right)}$$

From Table 1 it can be seen that the generalized lambda distribution provides a significantly more compact method of posterior representation as compared to all the other methods considered.

using an iterative, probabilistic approach. All posteriors at a given sensor are then associated with the estimated target information, and corresponding global posteriors are determined by fusing the associated local posteriors via multiplication of their joint probability densities.

Joint probability densities are typically estimated using histogram methods. However, such methods often introduce undesirable "artifact patterns" that hamper the global fusion process by introducing local extrema and obscuring the true global optimum. Furthermore, these artifacts can be amplified when the data is sparsely distributed as is often the case for particle filter applications. In an attempt to avoid such artifacts, interpolation-based methods are commonly used. However, such methods do not always remove the initial artifacts of the histogram and frequently introduce new ones. Our solution to minimizing histogram-based artifacts is based on an approximation technique referred to as generalized partial volume estimation (GPVE).

GPVE was originally developed for medical and remote sensing image registration applications. The problem of estimating the joint probability density of two uni-dimensional data sequences, however, provides a slight alteration to the image registration problem. Consequently, in order to apply the basic GPVE principles to the application of estimating joint histograms from 1-D data sequences, the original GPVE histogram estimation procedure outlined in as disclosed in H.

TABLE 1

Bandwidth Requirements

| Representation | Dimension | Available Bandwidth (floats) | Required Bandwidth (floats) per Component | Required Components per Accurate Posterior Representation | Number of Posteriors Accurately Communicated |
| --- | --- | --- | --- | --- | --- |
| Particle | 4 | 500 | 1 | 2000 | 0 |
| GMM | 4 | 500 | 14 | 20 | 1 |
| Parzen | 4 | 500 | 5 | 50 | 2 |
| GLD | 4 | 500 | 1 | 16 | 31 |
| Particle | 6 | 500 | 1 | 2000 | 0 |
| GMM | 6 | 500 | 27 | 20 | 0 |
| Parzen | 6 | 500 | 7 | 50 | 1 |
| GLD | 6 | 500 | 1 | 24 | 20 |

3.4 Reconstructing Local Posteriors

One advantage of using a quantile function like (3.3.2) to describe a distribution lies in its ability to efficiently generate random variates. For instance, if Q is the quantile function for a specific probability distribution, then through the use of the inverse transformation method, $$X=Q(u), u\in(0,1), \quad (3.4.1)$$

random variates, X, with quantile function, Q, can be generated with little effort. Consequently, since sources of uniform random variates over the interval (0,1) are readily available, (3.4.1) provides an efficient method for generating random variates from distributions whose quantile functions are known and computationally tractable. As a result, and as demonstrated in FIGS. 6a-6d, this property coupled with (3.3.2) allows for efficient and accurate reconstruction of local posteriors communicated through a sensor network via a set of GLD parameters.

3.5 Estimating Global Posteriors

After the local posteriors have been parameterized, communicated and reconstructed at any receiving sensor(s), the number of targets and corresponding positions are estimated Chen and P. K. Varshney, "Registration of Multimodal Brain Images: Some Experimental Results," *Proceedings of SPIE (Sensor Fusion: Architectures, Algorithms, and Applications VI)*, Vol. 4731, pp. 122-133, 3 Apr. 2002, Orlando, Fla.; H. Chen and P. K. Varshney, "Mutual Information Based CT-MR Brain Image Registration Using Generalized Partial Volume Joint Histogram Estimation," *IEEE Transactions On Medical Imaging*, Vol. 22, No. 9, pp. 1111-111; H. Chen, P. K. Varshney and M. K. Arora, "Performance of Mutual Information Similarity Measure for Registration of Multitemporal Remote Sensing Images," *IEEE Transactions on Geoscience and Remote Sensing*, Vol. 41, No. 11, pp. 2445-2454, November 2003; the contents of which are incorporated herein by reference, needs to be reformulated using the following mapping:

$$X^*:x \rightarrow X^*(x), x\in X$$

$$Y^*:y \rightarrow Y^*(y), y\in Y \quad (3.5.1)$$

where X is the discrete domain of the data sequence X* and Y is the discrete domain of the data sequence Y*. In addition, the values X*(x) and Y*(y) represent the actual data values of the two data sequences at the corresponding indices $x=x_i$, $y=y_j$ in terms of the sample spacing. Defining a real-valued kernel satisfying the constraints $$1.\ f(n) \geq 0, \text{ and} \qquad (3.5.2)$$

$$2.\ \sum_{n=-\infty}^{\infty} f(n) = 1$$

where $n \in Z$ and $Z$ is the set of all integers. For each $x_i \in X$, $y_j \in Y$, the joint histogram of $X^*$ and $Y^*$ can be updated in the following manner:

$$h(X^*(x_i+p), Y^*(y_j+q)) \leftarrow h(X^*(x_i+p), Y^*(y_j+q)) + f_{X^*}(p) \cdot f_{Y^*}(q)\ \forall p,q \in Z \qquad (3.5.3)$$

From (3.5.3) it can be seen that the increment of the joint histogram is represented in terms of the kernel functions corresponding to each data sequence. Furthermore, the first constraint in (3.5.2) ensures that the increments are non-negative while the second constraint in (3.5.2) ensures that the sum of the updated amounts are normalized to one for each corresponding pair of indices $x_i$ in $X^*$ and $y_j$ in $Y^*$.

The appropriate selection of a suitable kernel for use in (3.5.3) can depend on many factors, some of which may be the histogram grid parameters or the sparseness of the data in $X^*$ relative to $Y^*$. FIGS. 7a-7d illustrate various kernels of the form $f\ N(0,\sigma^2)$, all of which satisfy (3.5.2).

FIGS. 8a-8d illustrate a range-only particle distribution with standard, cubic-interpolated and GPVE histogram estimation—all independently normalized. From this figure it can be seen that the standard histogram generates a significant amount of distortion in the estimated distribution due to the sparseness of the particle data. Consequently, a poor representation for the range-only particle distribution results. The interpolated histogram minimizes some of the distortion observed in the standard approach. However, a substantial amount of distortion still remains. Finally, the GPVE histogram is observed to accurately reflect the true distribution of the range-only particle distribution.

4.0 Probabilistic DDF—Simulated Performance Results

Figure 9:
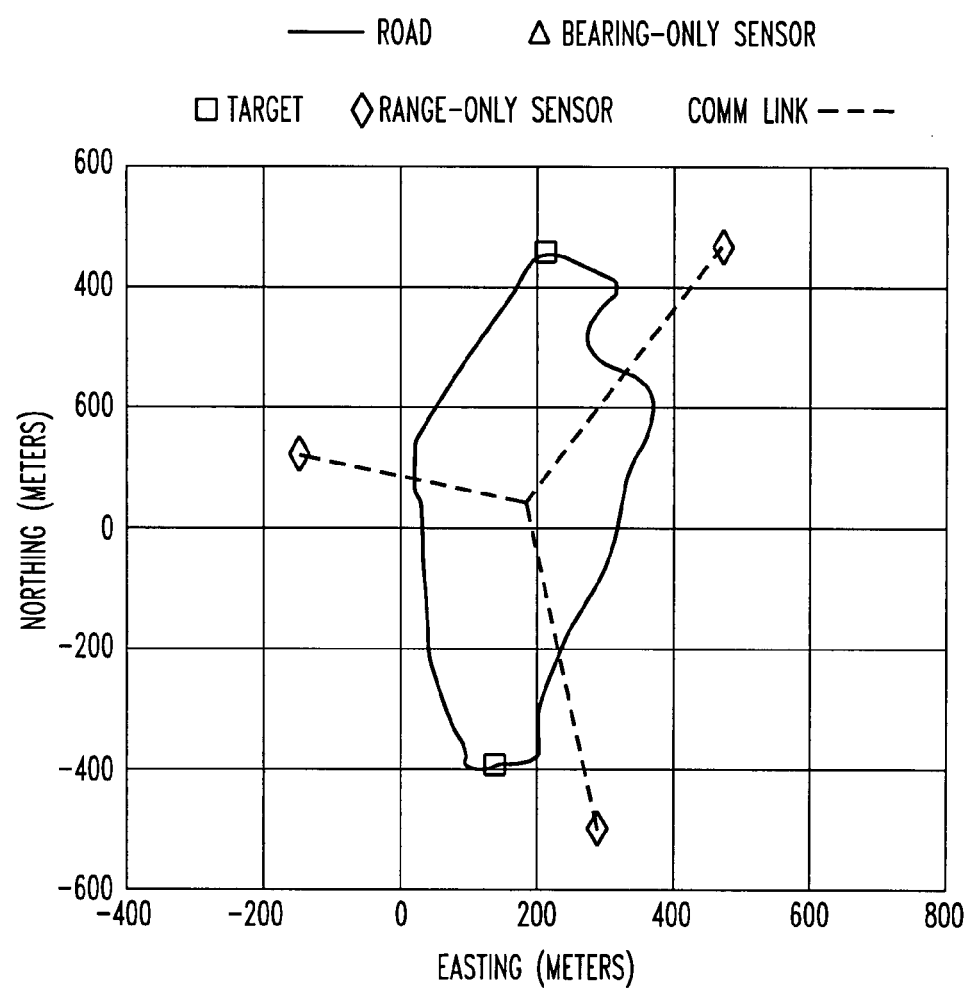
FIG. 9 is a graph of the simulation scenario of a preferred embodiment of the present invention.
Figure 10A:
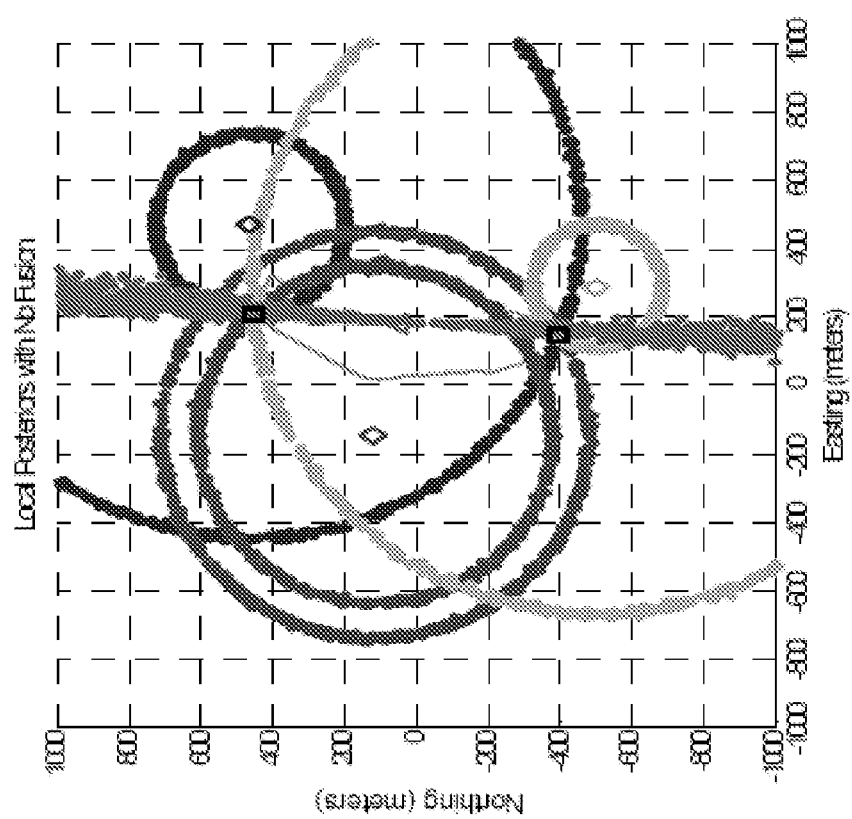
FIGS. 10a-10d are a series of graphs showing particle distribution snapshots in a preferred embodiment of the present invention.
Figure 10B:
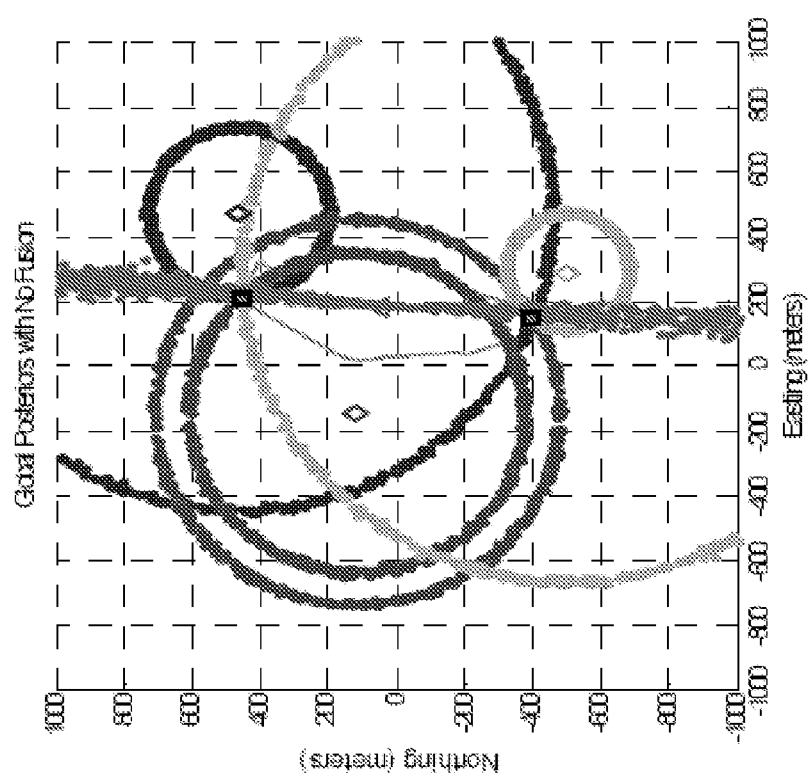
Figure 10C:
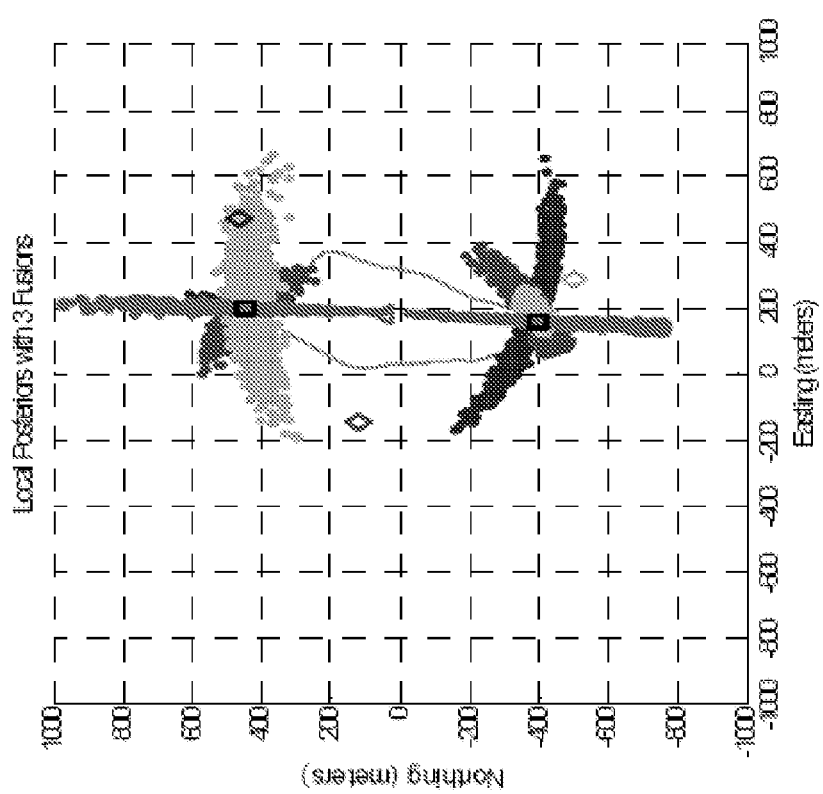
Figure 10D:
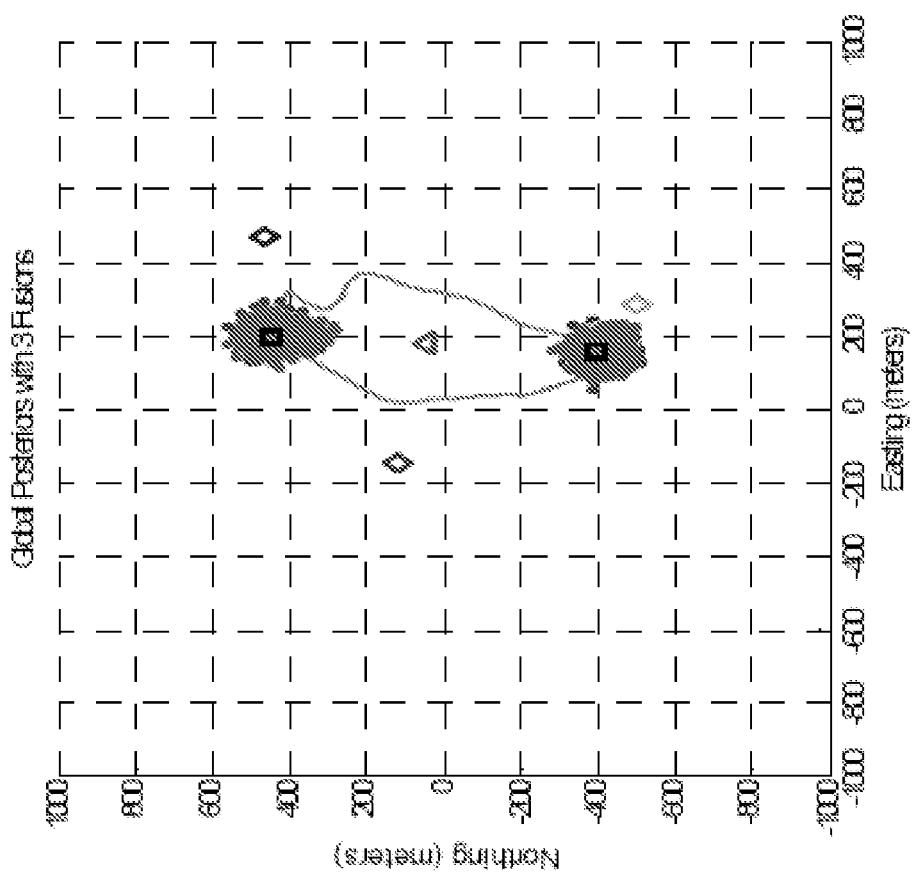

FIG. 9 illustrates the target path and sensor configuration for a simulated scenario consisting of two targets, three range-only sensors and one bearing-only sensor. In this simulation target traverses around the target path counter-clockwise one complete revolution. All local posteriors are estimated using 2000 particles. The sensor likelihood parameters used in (4.2.2) are given as follows:

1. Range-Only Sensors
   $\sigma_{z_r}$=50 meters downrange error at 500 meters
   $\theta_{min}$=0 degrees
   $\theta_{max}$=360 degrees
2. Bearing-Only Sensors
   $\sigma_{z_\theta}$=50 meters downrange error at 500 meters
   $\theta_{min}$=0 degrees
   $\theta_{max}$=360 degrees It will be understood that FIG. 9 illustrates the target path and sensor configuration for a simulated scenario consisting of two targets (squares), three range-only sensors (diamonds) and one bearing-only sensor (triangle). In this simulation, each target traverses around the target path counter-clockwise one complete revolution.

FIGS. 10a-10h illustrate snapshots of local posterior (top row) and global posterior (bottom row) particle distributions, color-coded relative to a specific sensor, for no fusion, 3 fusions, 6 fusions, and 10 fusions. From these figures it can be seen that the fused global posteriors for all sensors quickly collapse to the associated target of interest.

It will be understood that FIGS. 10a-10h illustrate snapshots of the global posterior particle distributions (i.e., global fusion image) for each sensor. The snapshots correspond to no fusion, 3 fusions, 6 fusions and 10 fusions. From these figures it can be seen that the fused global posteriors for all sensors quickly collapse to the associated target of interest as the amount of data fusion increases. Basically, what occurs is that as the sensors in the network share their local information with one another, the probability density function converges to the actual target position, a direct result of target localization and tracking through the use of multi-sensor data fusion (i.e., the highest probability of target location occurs at the points where the individual sensor observations overlap the most). As the amount of data fusion increases, the localization error becomes smaller (i.e., the probability density becomes "tighter" around the target).

Figure 11:
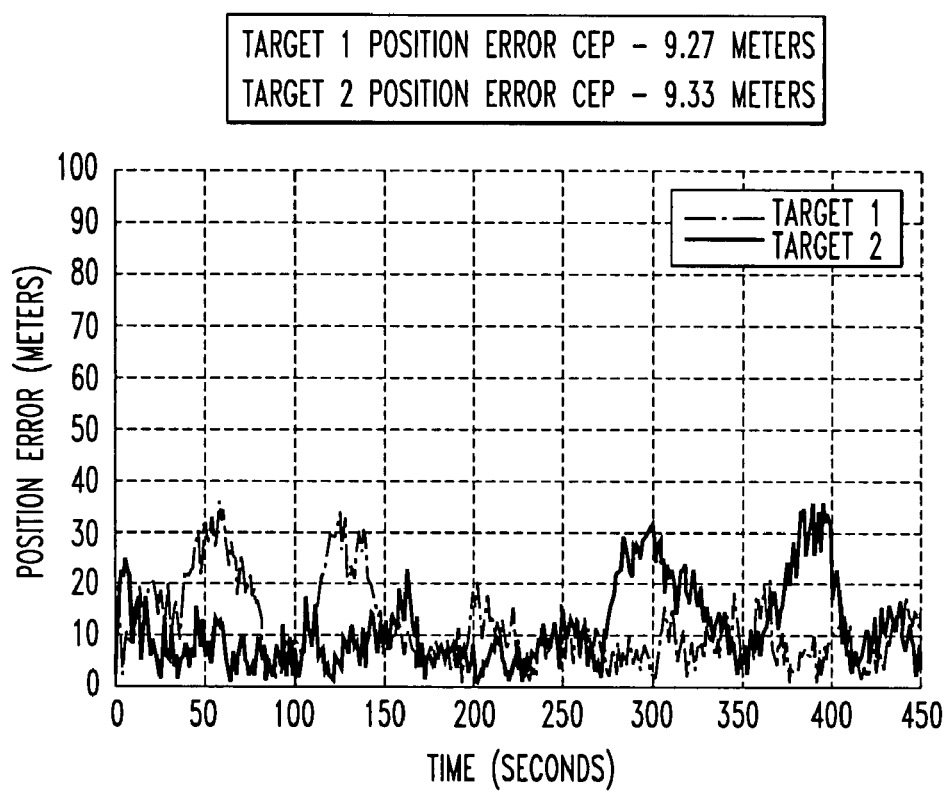
FIG. 11 is a graph showing position error in a preferred embodiment of the present invention.

FIG. 11 illustrates the norm of the position error between each target and the mean of the corresponding associated particle set at the bearing-only sensor. The error statistics for the range-only sensors are nearly identical to the error statistics of the bearing-only sensor illustrated in FIG. 11.

From FIG. 11 it will be understood that certain regions exist where the sensor modalities are not as complementary as other regions (i.e., approximately 60, 130, 300 and 390 seconds). These regions of concern can be compensated for, however, by either adding more sensors, reconfiguring the sensor modalities or rearranging the sensor placement. It will be understood that FIG. 11 illustrates the norm of the position error between each target and the mean of the corresponding associated particle set at the bearing-only sensor. From this figure it can be seen that certain regions exist where the sensor modalities are not as complementary as other regions (i.e., approximately 60, 130, 300 and 390 seconds). These regions of concern, due to poor geometric dilution of precision (GDOP), can be compensated for by either adding more sensors, reconfiguring the sensor modalities or rearranging the sensor placement. Regardless, from this figure it can be seen that the circular error probability (CEP) is less than 10 meters for both targets indicating that the probabilistic architecture outlined in this work is capable of accurately and efficiently fusing multi-source sensor data in non-linear/non-Gaussian environments.

Regardless, from FIGS. 10a-10h and 11 it can be seen that the probabilistic architecture outlined in this invention is capable of accurately and efficiently fusing multi-source sensor data in non-linear/non-Gaussian environments.

5.0 Summary

Those skilled in the art will understand that a highly-scaleable, Bayesian approach to the problem of performing multi-source data fusion and target tracking in decentralized sensor networks has been described. The probabilistic invention described herein provides full decentralization; seamless integration and efficient fusion of multi-source sensor data; and an unprecedented scaling capability.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for updating a target track, the method comprising:
receiving a measurement associated with a target track at a first sensor node;
estimating a local posterior density based on the received measurement at the first sensor node;
receiving parameterized data from a second sensor at the first sensor node; receiving third parameterized data from a third sensor at the first sensor node;
reconstructing a second local posterior density by a processor at the first sensor node based on the received parameterized data; reconstructing a third local posterior density by the processor at the first sensor node based on the received third parameterized data;
estimating a global posterior density using the estimated local posterior density the reconstructed second local posterior density at the first sensor node, and the reconstructed third local posterior density;
updating the target track using the estimated global posterior density by the processor at the first sensor node.

2. The method of claim 1, further comprising, at the first sensor node, parameterizing the estimated local posterior density; and sending the parameterized local posterior density to the second sensor.

3. The method of claim 2, wherein the estimated local posterior density is parameterized using a generalized lambda distribution.

4. The method of claim 1, wherein estimating the global posterior density comprises multiplying joint probability densities of the estimated local posterior density and the reconstructed second local posterior density.

5. The method of claim 1, wherein the local posterior density is estimated using a particle filter.

6. The method of claim 1, wherein the second local posterior density is reconstructed using an inverse transformation method.

7. A node comprising:
a sensor configured to generate a measurement associated with a target track;
a receiver configured to receive parameterized data from a second sensor node and to receive third parameterized data from a third sensor node; and
a sensor manager configured
to estimate a local posterior density based on the generated measurement;
to reconstruct a second local posterior density based on the received parameterized data; to reconstruct a third local posterior density based on the received third parameterized data;
to estimate a global posterior density using the estimated local posterior density the reconstructed second local posterior density; and the reconstructed third local posterior density; and
to update the target track using the estimated global posterior density.

8. The node of claim 7, wherein the sensor manager is further configured to parameterize the estimated local posterior density; and to send the
parameterized local posterior density to the second node.

9. The node of claim 8, wherein the estimated local posterior density is parameterized using a generalized lambda distribution.

10. The node of claim 7, wherein estimating the global posterior density comprises multiplying joint probability densities of the estimated local posterior density and the reconstructed second local posterior density.

11. The node of claim 7, wherein the local posterior density is estimated using a particle filter.

12. The node of claim 7, wherein the second local posterior density is reconstructed using an inverse transformation method.

13. A system comprising:
a plurality of sensing nodes, wherein each sensing node of the plurality of sensing nodes comprises
a sensor configured to generate a measurement associated with a target track;
a receiver configured to receive parameterized data from the plurality of sensing nodes; and
a sensor manager configured
to estimate a local posterior density based on the generated measurement;
to reconstruct a plurality of local posterior densities based on the received parameterized data;
to estimate a global posterior density using the estimated local posterior density and the reconstructed plurality of local posterior densities; and
to update the target track using the estimated global posterior density.

14. The system of claim 13, wherein estimating the global posterior density comprises multiplying joint probability densities of the estimated local posterior density and the reconstructed plurality of local posterior densities.

15. The system of claim 13, wherein the local posterior density is estimated using a particle filter.

16. The system of claim 13, wherein the sensor manager is further configured to parameterize the estimated local posterior density; and to send the parameterized local posterior density to the plurality of sensing nodes.

17. The system of claim 16, wherein the estimated local posterior density is parameterized using a generalized lambda distribution.

* * * * *